(12) United States Patent
Hennon

(10) Patent No.: US 8,596,589 B2
(45) Date of Patent: Dec. 3, 2013

(54) ATTACHABLE GROMMETS FOR HANGING PIPES

(75) Inventor: John Hennon, Wall Township, NJ (US)

(73) Assignee: Syntiro Dynamics LLC, Wall Township, NJ (US)

( * ) Notice: Subject to any disclaimer, the term of this patent is extended or adjusted under 35 U.S.C. 154(b) by 171 days.

(21) Appl. No.: 12/481,016

(22) Filed: Jun. 9, 2009

(65) Prior Publication Data

US 2010/0308183 A1      Dec. 9, 2010

(51) Int. Cl.
F16L 3/10 (2006.01)

(52) U.S. Cl.
USPC ............... 248/67.5; 248/65; 248/71; 248/73; 248/74.1

(58) Field of Classification Search
USPC ........... 248/67.5, 67, 65, 49, 58, 73, 71, 74.5, 248/74.4, 229.26, 229.25, 229.2; 174/146, 174/40 R, 64, 656, 657; 138/113; 403/345; 24/280, 282, 284, 16 R, 279
See application file for complete search history.

(56) References Cited

U.S. PATENT DOCUMENTS

| | | | |
|---|---|---|---|
| 824,544 A | 6/1906 | Hossege | |
| 2,355,742 A | 8/1944 | Morehouse | |
| 2,362,124 A | 11/1944 | Ellinwood | |
| 2,404,531 A | 7/1946 | Robertson | |
| 2,442,833 A | 6/1948 | Watkins | |
| 3,244,388 A | 4/1966 | Coffman | |
| 3,266,761 A | 8/1966 | Walton et al. | |
| 3,742,119 A * | 6/1973 | Newman | 174/656 |
| 3,848,839 A | 11/1974 | Tillman | |
| 3,851,979 A | 12/1974 | Becker | |
| 4,004,766 A | 1/1977 | Long | |
| 4,270,250 A | 6/1981 | Schon | |
| 4,442,990 A * | 4/1984 | Krueger | 248/62 |
| 4,784,363 A | 11/1988 | Brown et al. | |
| 5,404,914 A | 4/1995 | Ziu | |
| 5,971,663 A * | 10/1999 | Brothers | 405/125 |
| 5,992,802 A * | 11/1999 | Campbell | 248/68.1 |
| 5,996,945 A * | 12/1999 | Coles et al. | 248/68.1 |
| 6,002,088 A * | 12/1999 | Ehmann | 174/657 |
| 6,161,589 A | 12/2000 | Bolotte et al. | |
| 6,799,607 B1 | 10/2004 | Friedline et al. | |
| 7,806,374 B1 * | 10/2010 | Ehmann et al. | 248/67.5 |
| 2005/0022891 A1 | 2/2005 | Friedline et al. | |
| 2005/0205722 A1 | 9/2005 | Krueger | |

* cited by examiner

Primary Examiner — Todd M. Epps
(74) Attorney, Agent, or Firm — Jon Fallon, Esq.

(57) ABSTRACT

The present invention relates to block style tube and pipe hangers which include polymeric grommets that are used as a dampener or insulator for hanging tubes and pipes and particularly to a post and port arrangement for securing and aligning the silicone grommets during initial mounting and placement. The grommets are typically two opposing symmetrical parts that together define a passage having an inner diameter which directly surrounds and supports the pipe or tube, the post and port arrangement provides a structure and method for connecting the polymeric grommet parts and supporting the grommets on the pipe or tube during installation of the frame and support structure.

11 Claims, 5 Drawing Sheets

ATTACHABLE GROMMETS FOR HANGING PIPES

FIELD OF THE INVENTION

The present invention relates to block style tube and pipe hangers which include plastic or silicone grommets that are used as a dampener or insulator for hanging tubes and pipes and particularly to a post and port arrangement for securing and aligning the polymeric grommets during initial mounting and placement. The grommets are typically two opposing symmetrical parts that together define a passage having an inner diameter which directly surrounds and supports the pipe or tube, the post and port arrangement provides a structure and method for connecting the polymeric grommet parts and supporting the grommets on the pipe or tube during installation of the frame and support structure.

BACKGROUND OF THE INVENTION

Pipe and tube supports are known for their use in supporting piping systems in residential and commercial buildings as well as throughout numerous industrial manufacturing facilities, for example, food, dairy, beverage, chemical, personal care, bioprocessing, and pharmaceutical manufacturing industries. Many pipe hanging configurations have either an inner layer or an inner block made from some elastomeric material to provide some combination of dampening, shock absorption, and insulation. With respect to industrial facilities, especially those in which clean rooms, sanitary and sterile environments are critical to the manufacturing process, the known pipe supports are configured to have a smooth contact surface on the insert to prevent bacterial build up and other contaminants from collecting.

Block style hangers may use plastic or silicone grommets which define an inner diameter (I.D.) to directly support and encompass the outer diameter (O.D.) of a pipe or tube. The silicone or plastic grommets are themselves supported by a metal frame which is often welded to supporting structural steel or secured by threaded connections to a hanger. These block style hangers may be used individually or due to their substantially square or rectangular shape may alternatively be easily and efficiently stacked in a vertical relationship to provide an offset between multiple pipes arranged and mounted in parallel.

The grommets act as a dampening cushion or insulator between the hardware and the supported utility. The grommet parts define the molded I.D. which fits around the O.D. of the pipe, tube or conduit. The size of the I.D. in the grommet controls the amount of force required to allow the tube, pipe or conduit to slide through the grommets. A smaller I.D. creates a tight fit or an anchor and a larger I.D. creates a loose fit or a guide which allows the tube, pipe or conduit to slide along an axis. The known grommets and inserts for such hangers are held together and in place around the pipe or conduit solely by the use of mounting hardware and framework or brackets that attach the grommets to one another around the pipe or conduit. This creates a problem for the installer since the grommets must be both held in position by the installer, usually by hand, relative to the pipe or tube, and also in respect to one another while the hardware and framework are installed. Also, because the grommets are not secured together, the sliding of the pipe or tube can cause shifting of the grommet parts relative to one another and with respect to the mounting hardware and framework.

U.S. Pat. No. 4,270,250 to Schon discloses an improved clamp for tubular members that uses interchangeable elastomeric inserts. Schon '250 provides a way for the inserts to attach to a clamping block, but does not provide a way for the inserts to attach to the tube. Furthermore, the clamping block can only be attached by using external fastening devices.

U.S. Patent Application No. 2005/0205722 A1 to Krueger discloses a pipe and tube support that claims a swivel style mounting point along a vertical axis with an opening having a single bolt capture and opposing hinge placed at a 90° angle off of the vertical axis. The Krueger '722 support also has upper and lower dome-shaped housing sections with internal liners for holding the pipe. The internal liners are attached to the hardware used for hanging the pipe and do not provide an efficient way to secure the liners together and to attach the liners to the pipe.

OBJECTS AND SUMMARY OF THE INVENTION

The present invention relates to block style pipe, tube and conduit supports that provide a way to attach around a pipe, tube, or conduit. The invention has opposing grommets of a polymeric material, such as plastic, silicone, or PVC, that attach to each other around a pipe. A further embodiment has a single grommet of an elastomeric material, such as silicone, rubber, or some type of thermoplastic, that can be twisted and then slipped or placed around a pipe. The grommets are used to dampen and insulate the supported conduit in the hanger or support. During installation, once the grommets are either attached to each other or twisted and placed around the tube, pipe or conduit, the accompanying hardware can be installed more efficiently because the installer does not need to manually hold the grommet parts together and in place while the mounting framework is installed. With the grommets or singular grommet block self-supporting itself on the pipe, and with the bolt holes through the grommets aligned, the installer can use both hands to install hardware, framework and supporting brackets for the grommets and pipe supports. The block shape of the invention allows the grommets to be stacked on top of each other, allowing the invention to be used for hanging multiple pipes. This invention works with pipes, tubes, and conduits of all different standards, such as ASME, ANSI, ASTM, and others.

An object of the present invention is to simplify the total installation of a pipe hanger by allowing the grommets to attach to each other or twist around a pipe, without having to rely on external mounting hardware or brackets to maintain the connection of the grommet(s) to the pipe during installation.

Another object of the invention is to provide a means of attaching two pipe hanger grommets to each other and around a pipe by utilizing a post and port system that creates a compression fit due to the relative sizes of the post and port. The post and port shapes can be smooth, ribbed, barbed, etc. such that the fit inside of the port is secure and keeps the grommets attached to each other without assistance.

A further object of the present invention is to provide a means of attaching a grommet around a pipe by utilizing a grommet block made from a flexible material that has a split in one side to allow the block to be twisted and slipped or placed around a pipe.

A still further object of the invention is to properly align the grommet bolt holes when connected to allow the metal hardware to attach properly and easily each time the present invention is used.

A yet still further object of the invention is to provide a more efficient and safer method for installing pipe hangers since the present invention frees up a hand that would otherwise be used to hold the grommet block. Having the grommet block already on the conduit without the requirement to hold it in place while installing the metal hardware saves time and helps prevent the hardware from falling while it is being installed.

Another object of the invention is to act as either an anchor or a guide for supported pipes. In an application of this invention as an anchor, the installation of the invention will provide a tight fit around the supported conduit. An anchor or tight fit will prevent essentially all pipe rotation or displacement at the point of application. When this invention acts as a guide, the installation of the invention will provide a loose fit around the supported conduit. A guide or loose fit will permit pipe movement in a predetermined linear direction while the post and port structure ensures that pipe movement does not alter the grommet alignment or support in the framework or bracket. The material chosen for the grommet can help provide the desired properties to facilitate either the anchor or guide configuration.

A still further object of the present invention is the purpose of acting as a dampening cushion between the suspension assembly (consisting of an attachment to a ceiling, wall or other support and a rod or extension that attaches to the grommet block hardware) and the supported pipe, tube, or conduit. The invention is of a plastic or silicone material that supports the conduit inside. Further, the invention also acts as an insulator between the hardware and the supported pipe, tube, or conduit since the grommets are made from a nonconductive material.

A still further object of the present invention is a pipe supporting apparatus having a grommet block having an upper grommet and a lower grommet that defines a pipe passage therebetween and at least one post provided on one of the upper and lower grommets, at least one receiving port provided on the opposing corresponding one of the upper and lower grommets for receiving the at least one post, at least one bolt hole extending through the upper and lower grommets; and wherein the post and port are provided with a mating friction fit so that the upper and lower grommet blocks can be removably secured to one another without any corresponding hardware or support.

A still further object of the present invention is a pipe supporting apparatus having an elastomeric grommet block having a pipe passage formed therein, the grommet block having a first flange and a second flange flexible about a torsional axis to provide separation between a matingly engageable surface of the first and second flange; at least one bolt hole extending through the grommet block; and wherein the separation of the first and second flange allows the elastomeric grommet and the pipe passage to be positioned about and encompass a conduit.

The invention will now be described, by way of example only, with reference to the accompanying drawings, of which:

BRIEF DESCRIPTION OF THE DRAWINGS

FIG. 2a shows an inset of the planar end surface and connection points of the grommet of the present invention;

FIG. 4a shows an inset of the intermediate receiving bolt for connecting the stacked grommet blocks of the present invention.

DETAILED DESCRIPTION OF THE INVENTION

Figure 1:
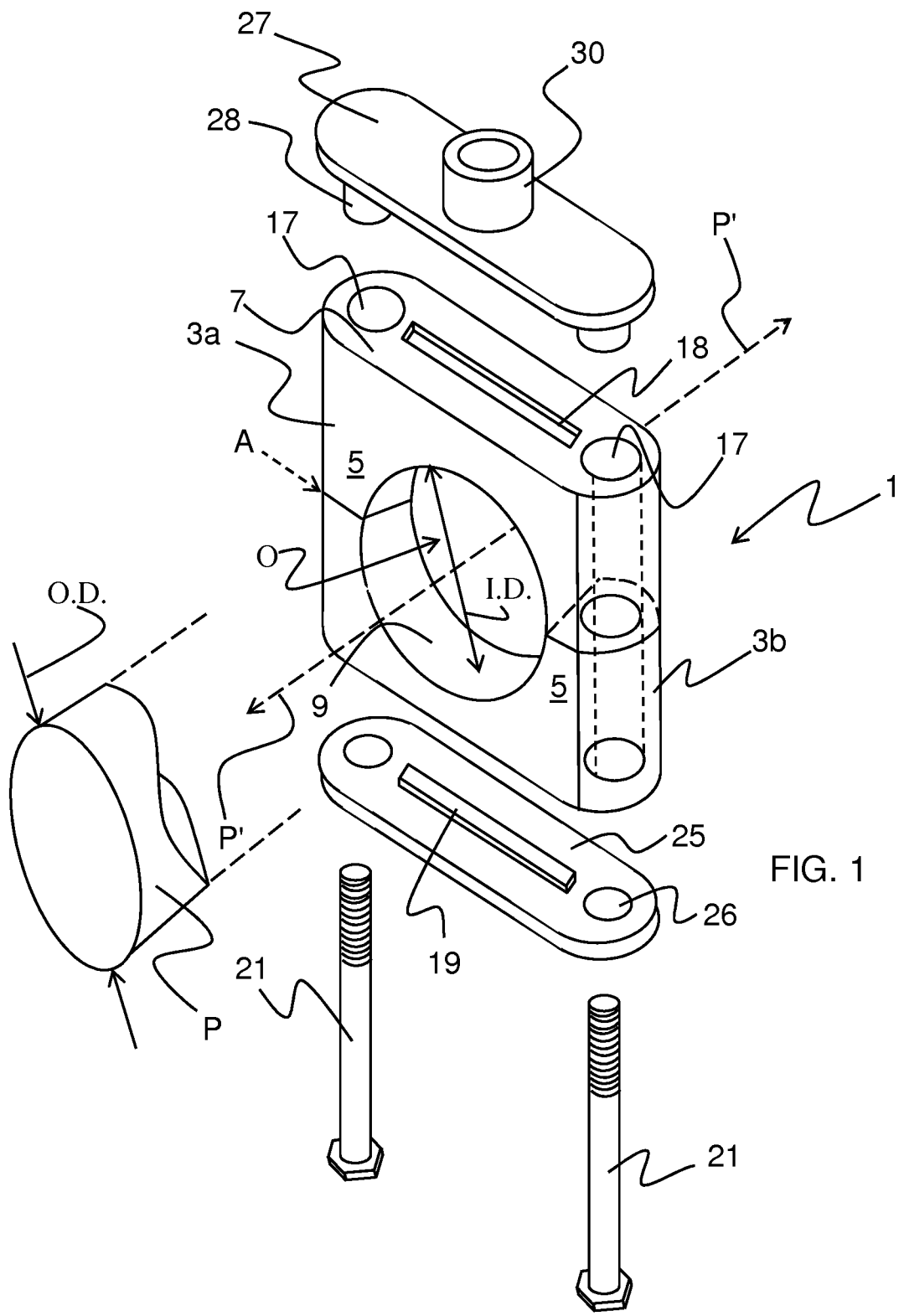
FIG. 1 shows an exploded isometric assembly view of the grommet block and framework.

In general, the present invention relates to a block style pipe and tube support including a grommet block 1 as shown in FIG. 1. The block 1 consists of two attached and substantially identical upper and lower grommets 3 defining a pipe passage O having an inner diameter (I.D.) through which a pipe, tube or conduit P having an outer diameter (O.D.) can pass. The two grommets 3 are attachable, and also separable, along a grommet separation plane A. The O.D. of the pipe can be accommodated by a range of I.D.'s of the grommet block depending on how secure the pipe is to be supported and held by the support. The tighter the tolerance of the pipe O.D. and the grommet block I.D. the more securely the pipe is held. It is to be appreciated that with a larger tolerance the pipe is more inclined, or permitted, to move or slide axially generally along a pipe axis P' in the pipe passage O. The grommets 3a, 3b can be modified to allow for different pipe sizes, tolerances etc., so that the pipe, tube, or conduit P is either securely held in the pipe passage area O or in the case of a loose fit, the conduit is guided essentially linearly along the pipe axis P' through the pipe passage O.

The grommets 3 have bolt holes 17 that extend through the grommets 3a, 3b in a substantially perpendicular alignment to the pipe axis P' extending through the passage O. To this end, each grommet 3 is comprised of a pair of oppositely disposed legs 5 through which a bolt hole 17 is formed, a substantially flat top surface 7 against which a portion of the framework is generally secured, a curved inner surface 9 defining the I.D. of the passage O and each leg 5 has a substantially planar end surface 11 best shown in FIG. 2 for matingly engaging with a corresponding planar end surface of another grommet. The top surface 7 of each grommet 3 may be provided with a detent or slot 18 for receiving a corresponding protrusion or key 19 formed in an attachment plate 25, 27, or even another grommet. Such a detent or slot 18 and protrusion or key 19 would facilitate maintaining alignment of the bolt holes 17 of grommet 3 with holes 26 in the attachment plate 25 as set forth in further detail below. The union of detent 18 and the protrusion 19 could also form a compression fit or some other means of attachment to enable connecting of the attachment plates 25, 27 to the grommets 3 until a bolt 21 can be inserted through the attachment plate hole 26 and the bolt hole 17 of the grommet and be secured to a threaded receiver 28 of the corresponding attachment plate.

The attachment plates 25, 27 form a framework that consists of a pair of the bolts 21 which extend through the attachment plate holes 26 and bolt holes 17 of the grommets 3 and connect and secure the attachment plates 25, 27 and grommets 3 together as shown in FIG. 1. During assembly, after passing through the holes 26 in the bottom attachment plate 25 and bolt holes 17 in the grommets 3a, 3b and coming out the other end, the bolts 21 connect to either the secured threaded receiver 28 in conjunction with the top attachment plate 27 or a nut supported on, or in conjunction with the top plate 27 to complete the assembly of the framework. The attachment plate 27 includes a hanger attachment receiver 30 which may connect to a hanger rod (not shown) or a hanger rod may be welded to the attachment plate, as part of a suspension assembly which supports the pipe support and pipe to a floor, ceiling, wall or other structural feature in a facility. The top and bottom attachment plates 25, 27 are pulled essentially flush against the grommets' top surfaces 7 when the bolts 21 are tightened in the receiver 28 or nut.

Figure 4:
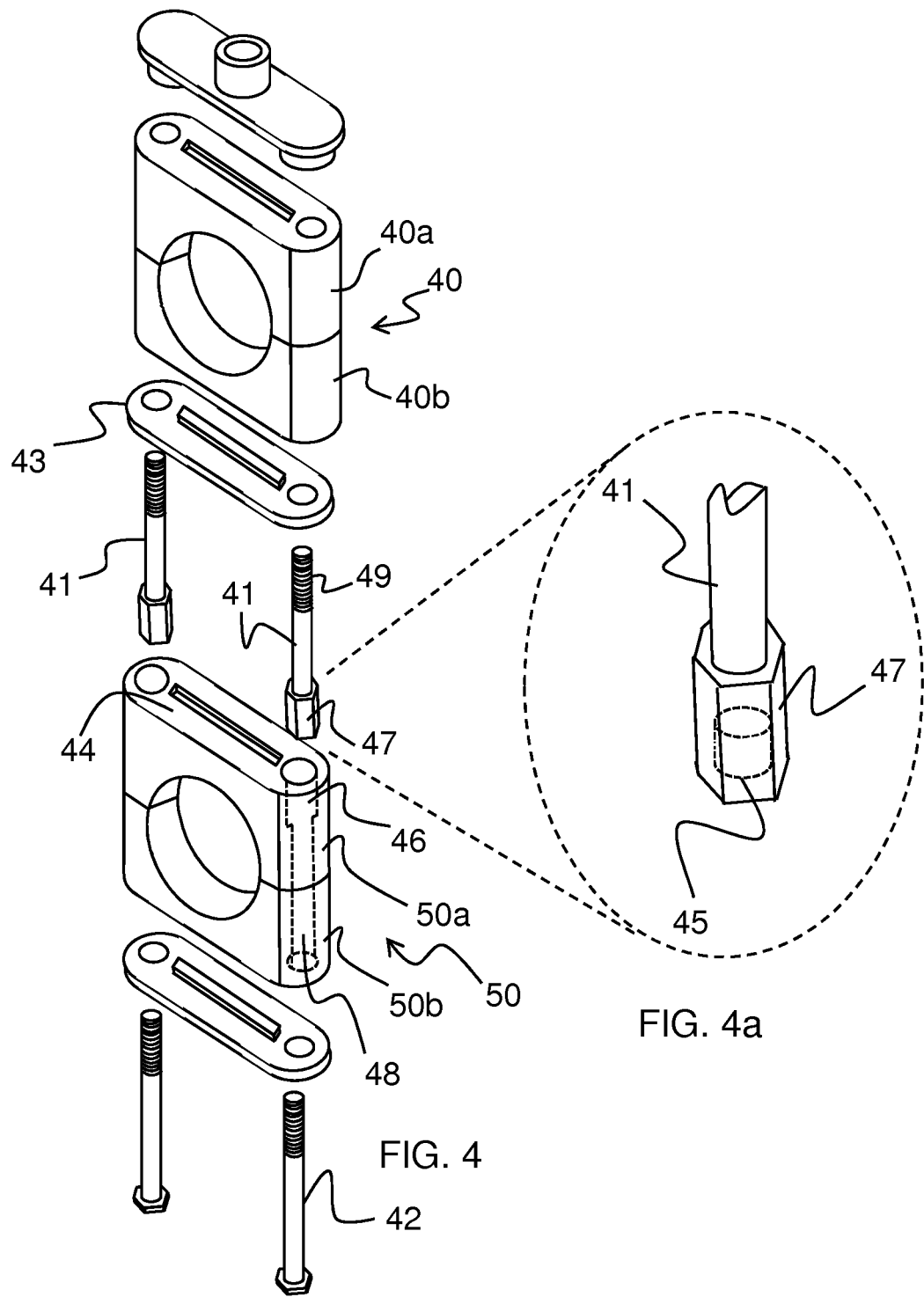
FIG. 4 shows an isometric assembly view of stacking the grommets of the present invention.

The inclusion of a protrusion or key 19 in the attachment plates 25,27 which corresponds to the detent or slot 18 on the surface of each grommet as discussed above not only aligns the grommet 3 with a respective top or bottom plate 25,27 but also maintains grommets 3 in planar and axial alignment with the attachment plates 25, 27. This can be particularly helpful in preventing the pulling of the grommet 3 away from the framework along the pipe axis P' due to axial movement of the pipe as supported by the apparatus through the passage O. It is to be appreciated that pipes are subjected to both axial and radial forces from fluids and gases passing through the pipes. Axial forces in particular tend to move the pipe along its pipe axis P' in one direction or the other. In this manner the pipe P actually is intended to slide somewhat relative to the curved inner surface 9 of the opening O of the grommet block 1. When the pipe P does not completely slide along the curved inner surface 9, in other words, the pipe P may stick somewhat to the curved inner surface 9 by friction due to the weight of the pipe or, alternatively the tolerance of the opening O relative to the O.D. of the pipe, the axial force and movement of the pipe P can pull the grommets 3 in the axial direction and away from the attachment plates 25,27. This is what is known as "creep", where the grommet block 1 tends to creep away from the supporting framework due to the axial forces of the pipe P. The slot 18 and protrusion 19 arrangement formed in the attachment plates 25, 27 and respective lower 3b and upper 3a grommets form a secure fit and connection between the attachment plates and the grommets preventing axial creep. The slot 18 and protrusion 19 arrangement also assist in appropriate alignment and stacking arrangements of the grommets 3 as seen in FIGS. 1 and 4. A further description of such stacking arrangements is provided below.

Figure 2:
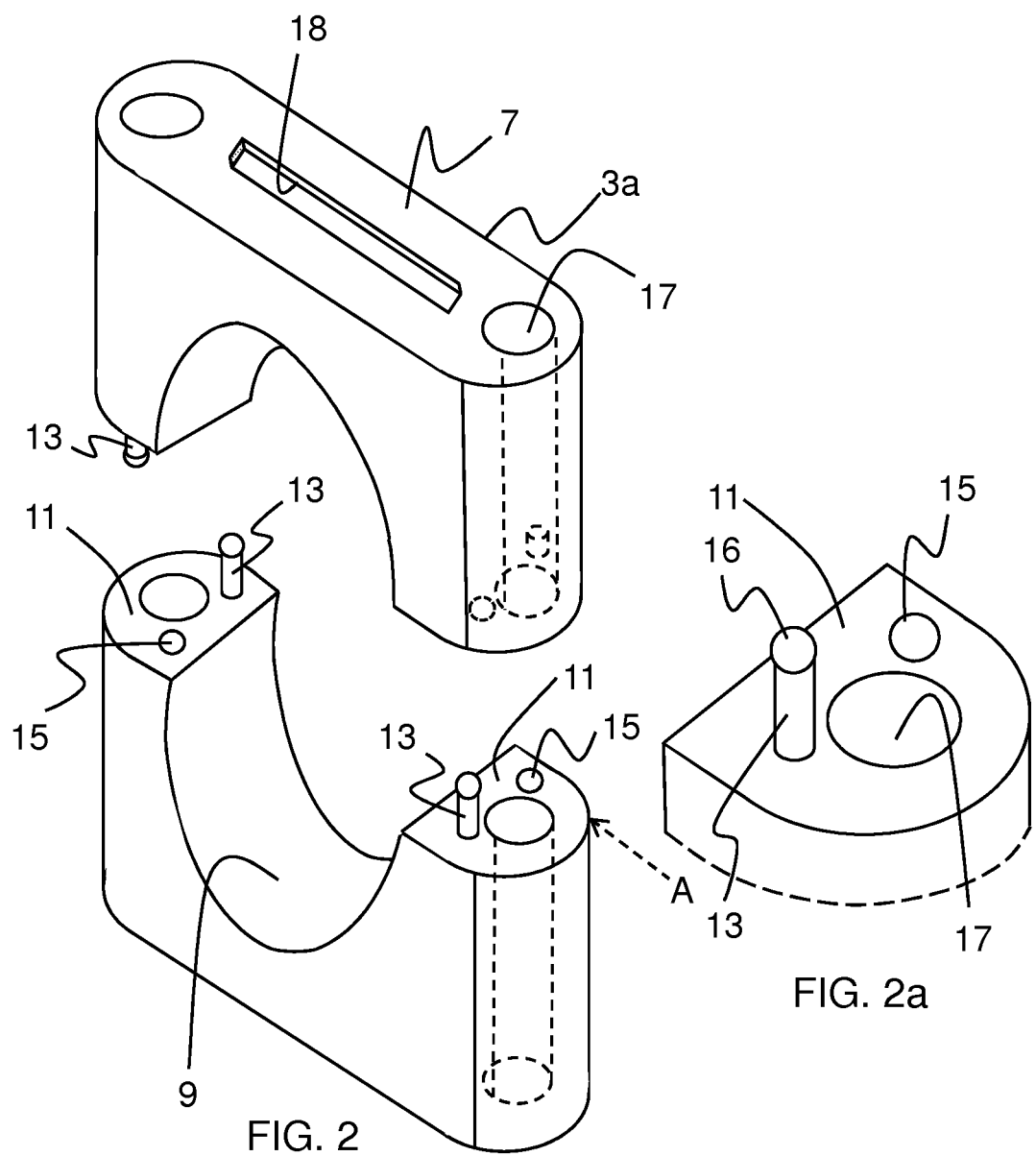
FIG. 2 shows an isometric view of the unattached grommets of the present invention.

FIG. 2 is an isometric view of the grommets 3 including the upper grommet 3a and the lower grommet 3b, separated from one another along the grommet separation plane A. As shown, the planar end surface 11 of each of the upper and lower grommets 3a, 3b illustrate a connection and stabilization system as to how the grommets 3 connect to form the stabilized grommet block 1, including in one embodiment a post 13 and port 15 on each of the planar end surfaces 11. The mating planar end surfaces 11 of the grommets 3 permit the upper and lower post 13 and port 15 of the grommets 3a, 3b to be essentially snap-fit and/or frictionally connected together in a manner that allows the grommet block 1 to hold together without the framework around it. Where the upper and lower grommets 3a, 3b are held together in this manner, the grommet block 1 can be self-supporting on and around a conduit without any additional hardware or attachment fixture. This aspect of the current invention—to simplify the installation and hanging process of the entire pipe hanger—is very important since the ability to connect the upper and lower grommets 3a, 3b around a pipe P so that the entire grommet block 1 is supported on the pipe or tube without any additional assistance from the installing personnel, frees the hands of the installer so that the installer can use both hands to complete attachment of the framework and the installation process.

The apparatus and method of the present invention also provides a safer process because it reduces the number of parts that the installer must concurrently handle and helps to prevent metal hardware from being dropped and falling. The simple attachment of the grommet block 1 to the conduit P without manual assistance after the upper and lower grommets 3a, 3b are fastened together by the respective post and port 13, 15 provides a stable situation for installing the accompanying hardware and framework. The connection of the two upper and lower grommets 3a, 3b is achieved through an interference fit, compression fit, snap fit or other frictional type connection between the relative posts and ports 13, 15. In one embodiment, the diameter of the ports 15 are made similar to, or even slightly smaller than the diameter of the posts 13 so that the posts 13 are securely and frictionally held after being inserted and pressed into the ports 15 due to the relative differences in diameters of the posts 13 and ports 15. This difference in relative diameter size of the posts and/or ports is such that an installer can, by manual force, push the posts 13 and ports 15 of the mating upper or lower grommet 3a, 3b into one another and form the grommet block 1 around the conduit P. This provides a secure and self-supporting connection for the grommet block 1 until the metal hardware of the framework is connected.

The attachment posts 13 can be made in any shape that would allow for a proper interference, friction or compression fit, such as smooth, ribbed, or even barbed. They can also be of any diameter or shape although cylindrical may be preferred. Similarly, the attachment ports 15 can be made in any corresponding size and/or shape that would provide a secure connection with the chosen posts 13. The posts 13 can also be made to allow easy initial alignment and entrance with the ports 15 by rounding or angling the free end 16 of the post 13 narrower than the rest of the post 13, as shown in FIG. 2a. The posts 13 and ports 15 should be sized such that there is a secure fit between the two upper and lower grommets 3a, 3b when pressed together and should provide sufficient frictional resistance so that the connection will not be lost unless some external force is applied, such as the manual force of the upper and lower grommets 3a, 3b being pulled apart. The height and depth of the respective posts 13 and ports 15 should be made in a relative manner so as to allow the connection surfaces 11 to touch when the upper and lower grommets 3a, 3b are fully engaged so that the metal hardware of the framework is readily attached and tightened on the grommet block 1.

Figure 3:
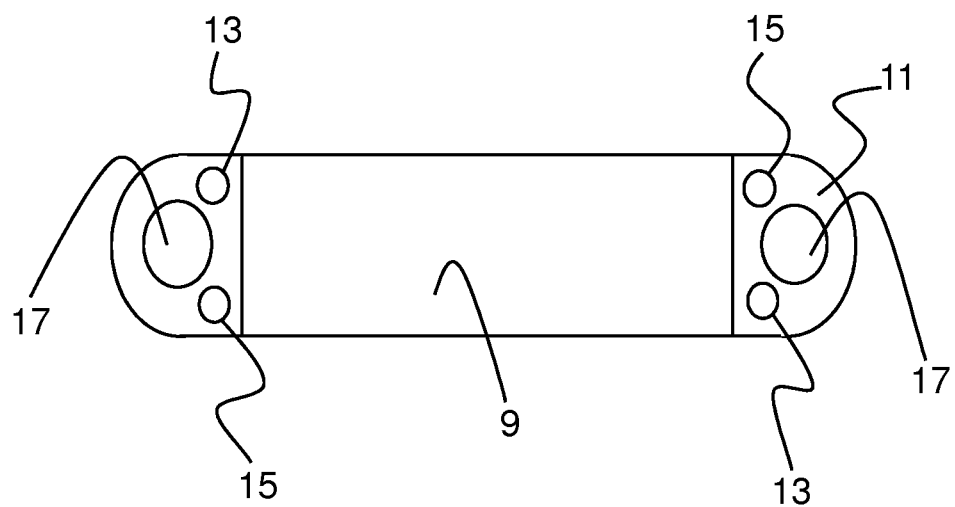
FIG. 3 shows a plan view of the connection points of the grommet of the present invention.

FIG. 3 is a planar view of the bottom of the grommet 3 of the present invention illustrating the location of the posts 13 and ports 15. One end of the grommet 3 consists of a post 13 and a port 15 equally and oppositely spaced in both distance and angle from the bolt hole 17. The opposite end of the grommet 3 consists of an oppositely disposed configuration of the post 13 and port 15. This view also shows that the arrangement of the post 13 and port 15 locations do not interfere with the bolt hole 17. The oppositely disposed configuration has the advantage of adding to the efficiency of connecting the grommets 3 to each other because the connection will work whether it is in the method shown in FIG. 2 or whether one of the grommets 3a, 3b is rotated 180 degrees.

FIG. 4 is a modified form of the present invention that takes into consideration the necessary stacking of grommet blocks with one another. In this embodiment an intermediate receiving bolt 41 and an intermediate frame plate 43 are provided to link the top grommet block 40 with a lower grommet block 50. The intermediate receiving bolt 41 is provided with a receiving cavity 45 in the head 47 of the intermediate receiving bolt 41 as shown in FIG. 4a for receiving the threaded end of a conventional bolt 42, or the threaded shaft of another intermediate receiving bolt 41. The inset grommet 50a of the lower grommet block 50 has a bolt head receiving cavity 46 within the bolt passage 48 for receiving the head 47 of the intermediate receiving bolt 41 to allow contiguous contact of the intermediate frame plate 43 with the upper surface 44 of the inset grommet block 50a. In this way, any number of grommets blocks may be stacked together to accommodate the alignment and support of multiple pipes.

Figure 5:
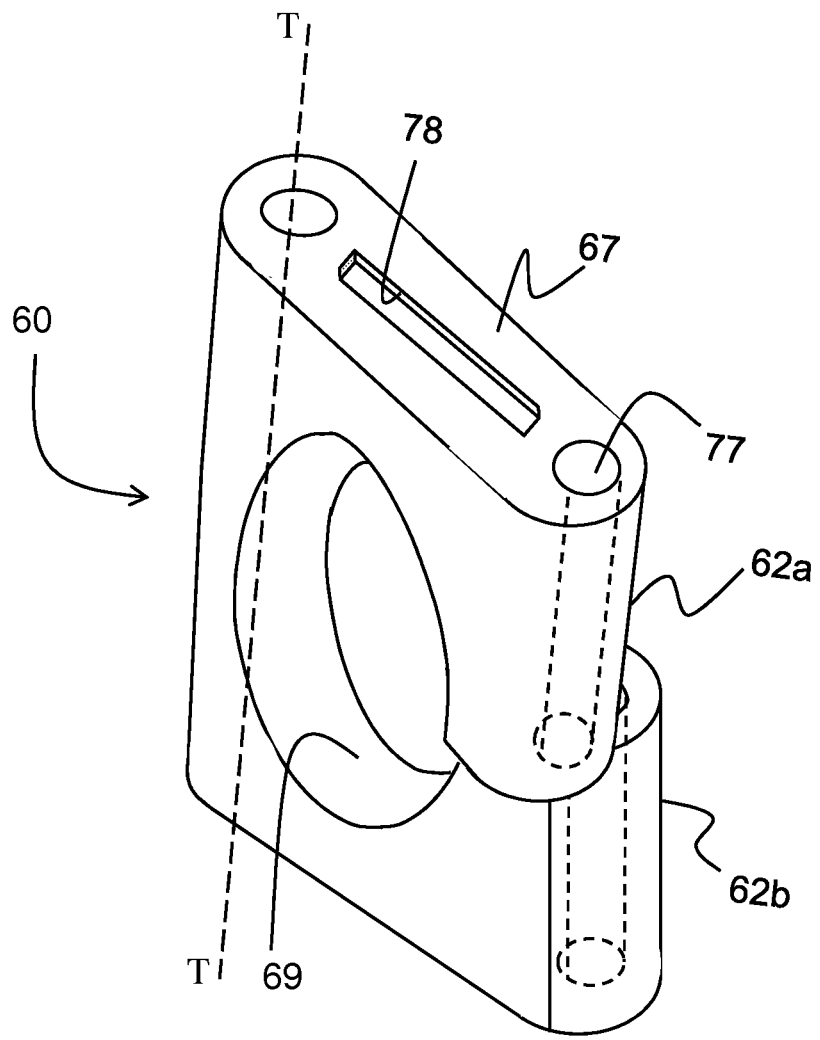
FIG. 5 shows an isometric view of the elastomeric grommet block in a flexed position about a torsional axis.

FIG. 5 is an isometric view of another embodiment of the grommet wherein the grommet is a single block made from an elastomeric material. In this embodiment, the elastomeric grommet block 60 can be flexed or twisted about a torsional axis T to provide a large enough separation between a first flange 62a and a second flange 62b to be able to fit the pipe passage O of the grommet block 60 around a pipe, tube, or conduit P. The grommet block 60 is of sufficient flexibility to separate and surround the pipe P, and of sufficient rigidity to reform to original dimensions and contours in order to securely grip around the pipe, tube or conduit P. In this way, after attachment of the grommet block 60, the bolt holes 77 are properly aligned to assist in the insertion of hardware to secure a framework to the grommet block 60 around the pipe P. Here, with a substantially more flexible elastomeric bock 60, there is a tremendous potential for creep due to the axial loads as explained above so the anti-creep cleat features 78 of the block 60 become increasingly important to ensure there is no failure of the grommet 60 and pipe support product.

The invention has been described in detail with particular reference to certain preferred embodiments thereof, but it will be understood that variations and modifications can be effected within the spirit and scope of the invention.

I claim:

1. A pipe supporting apparatus comprising:
   a grommet block having an upper grommet and a lower grommet fabricated from an elastomeric material that define a pipe passage therebetween to support a pipe;
   at least one post provided on one of the upper and lower grommets;
   at least one receiving port provided on the opposing corresponding one of the upper and lower grommets for receiving the at least one post;
   at least one bolt hole extending through the upper and lower grommets;
   a first state wherein the post and port are provided solely with a mating friction fit so that the upper and lower grommet blocks can be initially removably secured to one another without any corresponding hardware, framework or support around the pipe; and
   a second state wherein a framework is provided for supporting the grommet block about the pipe and the framework includes a rigid upper attachment plate and a rigid lower attachment plate, each upper and lower attachment plate having a planar contact surface to mate with a respective substantially planar surface of each of the elastomeric upper and lower grommets, and a protrusion is provided on one or each of the respective mating surfaces to maintain the upper and lower attachment plates and upper and lower grommets in planar alignment when the pipe slides axially relative to the grommet block.

2. The pipe supporting apparatus as set forth in claim 1 wherein each of the upper and lower grommets have at least one matingly engageable surface supporting one of the post and port to be frictionally engaged.

3. The pipe supporting apparatus as set forth in claim 2 wherein each of the upper and lower grommets have a pair of legs, and each leg comprises a matingly engageable surface for supporting at least one of the post and port.

4. The pipe supporting apparatus as set forth in claim 3 wherein each leg of each of the upper and lower grommets has at least one bolt hole extending completely therethrough and at least one post and at least one port.

5. The pipe supporting apparatus as set forth in claim 4 wherein the post and port of a first leg of each of the upper and lower grommets are equally spaced in both distance and angle from the at least one bolt hole; and a second leg of each of the upper and lower grommets having an at least one second bolt hole has an oppositely positioned and equally disposed post and port.

6. The pipe supporting apparatus as set forth in claim 1 wherein the protrusion fits into a detent formed in the opposing contact surface of the attachment plate or the planar surface of the upper and lower grommets to facilitate an attachment at the opposing contact surfaces with a respective protrusion of the supporting framework.

7. A method of connecting a pipe supporting apparatus around a pipe, the method comprising the steps of:
   providing a grommet block having an upper grommet and a lower grommet defining a pipe passage therebetween;
   forming at least one post provided on one of the upper and lower grommets;
   forming at least one receiving port provided on the opposing corresponding one of the upper and lower grommets for receiving the at least one post;
   defining at least one bolt hole extending through the upper and lower grommets; and
   engaging the post and port solely by a mating friction fit so that the upper and lower grommet blocks can be removably secured to one another about the pipe without any corresponding hardware or support; and
   subsequently attaching a substantially rigid framework around the elastomeric grommet block supported about the pipe wherein the framework includes a rigid upper attachment plate and a rigid lower attachment plate, each upper and lower attachment plate having a planar contact surface to mate with a respective substantially planar surface of each of the elastomeric upper and lower grommets, and a protrusion is provided on one or each of the respective mating surfaces to maintain the upper and lower attachment plates and upper and lower grommets in planar alignment when there is axial movement of the pipe relative to the grommet block to reduce creep of the elastomeric grommet block away from the rigid framework.

8. The method of connecting a pipe supporting apparatus as set forth in claim 7 further comprising the step of forming on each of the upper and lower grommets at least one matingly engageable surface supporting one of the post and port to be frictionally engaged.

9. The method of connecting a pipe supporting apparatus as set forth in claim 8 further comprising the step of providing each of the upper and lower grommets having a pair of legs, and each leg comprises a matingly engageable surface for supporting at least one of the post and port.

10. The method of connecting a pipe supporting apparatus as set forth in claim 9 further comprising the step of forming in each leg of each of the upper and lower grommets at least one bolt hole extending completely therethrough and at least one post and at least one port.

11. The method of connecting a pipe supporting apparatus as set forth in claim 7 further comprising the step of fitting the protrusion into a detent formed in the opposing contact surface of the attachment plate or the planar surface of the upper and lower grommet to facilitate an attachment the upper and lower grommet and the attachment plate.

* * * * *